ISOTOPIC ELECTRIC GENERATOR USING THERMOELECTRIC ELEMENTS

Filed April 18, 1968 3 Sheets-Sheet 1

Dec. 29, 1970 JEAN-PIERRE FREUND ET AL 3,551,212

ISOTOPIC ELECTRIC GENERATOR USING THERMOELECTRIC ELEMENTS

Filed April 18, 1968 3 Sheets-Sheet 2

United States Patent Office 3,551,212

Patented Dec. 29, 1970

3,551,212

ISOTOPIC ELECTRIC GENERATOR USING THERMOELECTRIC ELEMENTS

Jean-Pierre Freund, Creteil, and Roger Stoll, Paris, France, assignors to Societe Nationale d'Etude et de Construction de Moteurs d'Aviation (SNECMA) and Compagnie Generale de Telegraphie Sans Fil (C.S.F.), Paris, France Filed Apr. 18, 1968, Ser. No. 722,247
Claims priority, application France, Apr. 24, 1967, 103,997
Int. Cl. G21h *1/10*
U.S. Cl. 136—202 6 Claims

ABSTRACT OF THE DISCLOSURE

The radioisotope-powered electric generator has a thermopile clamped between a metal housing acting as a cold source and a heat collector having an internal bore which receives the isotopic source. The collector is forced toward the thermopile by springs which bear on a support secured to said housing. Heat insulating material fills the space between the heat collector and housing. The source may be inserted into the collector through a closable opening in the housing.

This invention is directed to an electric generator of the thermopile type in which a radioisotope is used as the heat source and which is suitable for use as an unattended, long-lived generator for supplying power to navigational beacons.

There are many different types of electric generators already in existence in which the heat obtained from the decay of a radioactive source is used to provide the heat source of a thermopile. Among well-known systems of this type are the so-called "RIPPLE" generators of British design and others of American design, including the so-called "SNAP" systems in the particular series to which odd numbers have been assigned. The majority of these devices make use of a strontium titanate source since this element is a $\beta$-emitter, which is preferable to $\alpha$-emitters, and has the advantage of a very slow radioactive decay. On the other hand, the low specific activity of strontium presents a difficult problem when it is sought to construct a low-power generator having an output of less than about 1 watt. In such a case, even when using a thermopile of doped bismuth telluride having a relatively low optimum heat source temperature of the order of 230° C., it is difficult to attain this value in low-power generators by reason of the high ratio of the surface area to the volume of the source. Thus, in one generator of this type which has already been constructed, the temperature does not exceed 135° C. and the resulting efficiency is therefore low.

Moreover, it is essential to maintain the contact thermal resistance between the radioactive source and the thermopile at a value which is as low as possible, thereby entailing the need for contact under pressure. However, thermoelectric material is extremely fragile. In the methods employed up to the present time, the source was placed in direct contact with the thermopile. Consequently, at the time of assembly of the source (necessarily carried out in a hot cell by means of a manipulator), there arose a danger of fracture of the thermopile and interposition of the fragments between the source and the thermopile.

The invention is directed to the design of a generator which meets practical requirements more effectively than comparable systems of the prior art, particularly insofar as the problems referred-to above are accordingly eliminated. With this object in mind, the invention proposes an electric generator of the thermopile type which comprises, within a metallic housing constituting a cold source: a thermopile applied against a support which is rigidly fixed to said housing; a thrust rod formed of heat-insulating material and urged towards the thermopile by elastic means which bear on said housing; a heat collector which has an internal bore for accommodating a radioactive isotope source constituting a heat source and which is interposed between the thermopile and the thrust rod; and a packing of thermally and electrically insulating material which separates said thermopile and said heat collector from said housing.

The invention also consists of further arrangements which are preferably intended for use in conjunction with the preceding but can also be employed independently thereof. These arrangements will become more readily apparent from the following description of a generator which constitutes one embodiment, said description being given by way of non-limitative example and reference being made therein to the accompanying drawings, in which.

Figure 1:
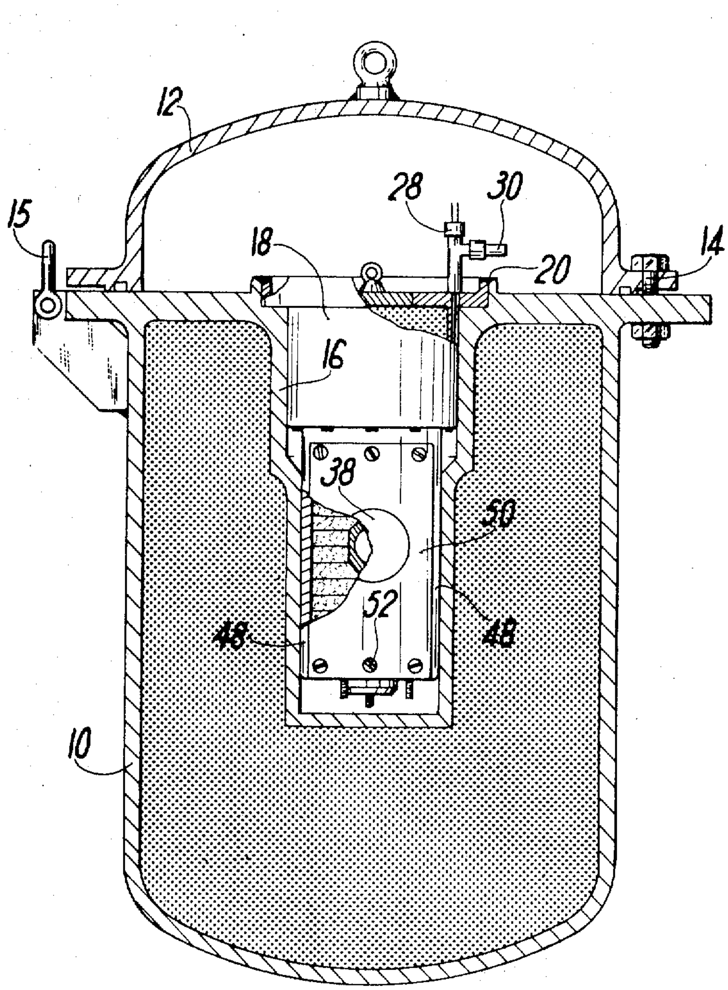
FIG. 1 is a view of the generator in elevation and in partial cross-section along the vertical mid-plane.

The generator which is shown in FIG. 1 is contained in a leak-tight vessel having a lower portion 10, a lid 12 which is fixed in position by means of flanges and bolts 14 and handling brackets fitted with lifting shackles 15. A cylindrical housing 16 designed to accommodate the core of the generator is fixed by welding to the lower portion 10. The space provided between said cylindrical housing and the lower portion 10 of the vessel is packed with a heavy radiation-absorbing material (usually lead). A plug 18 formed by a metallic casing 19 which also contains a packing of heavy material closes the housing 16. In the form of construction which is shown in FIG. 1, the plug 18 and the housing are assembled by means of a welded joint 20 which seals off the generator core and therefore permits the removal of the vessel lid 12 without any attendant danger of contamination.

Figure 2:
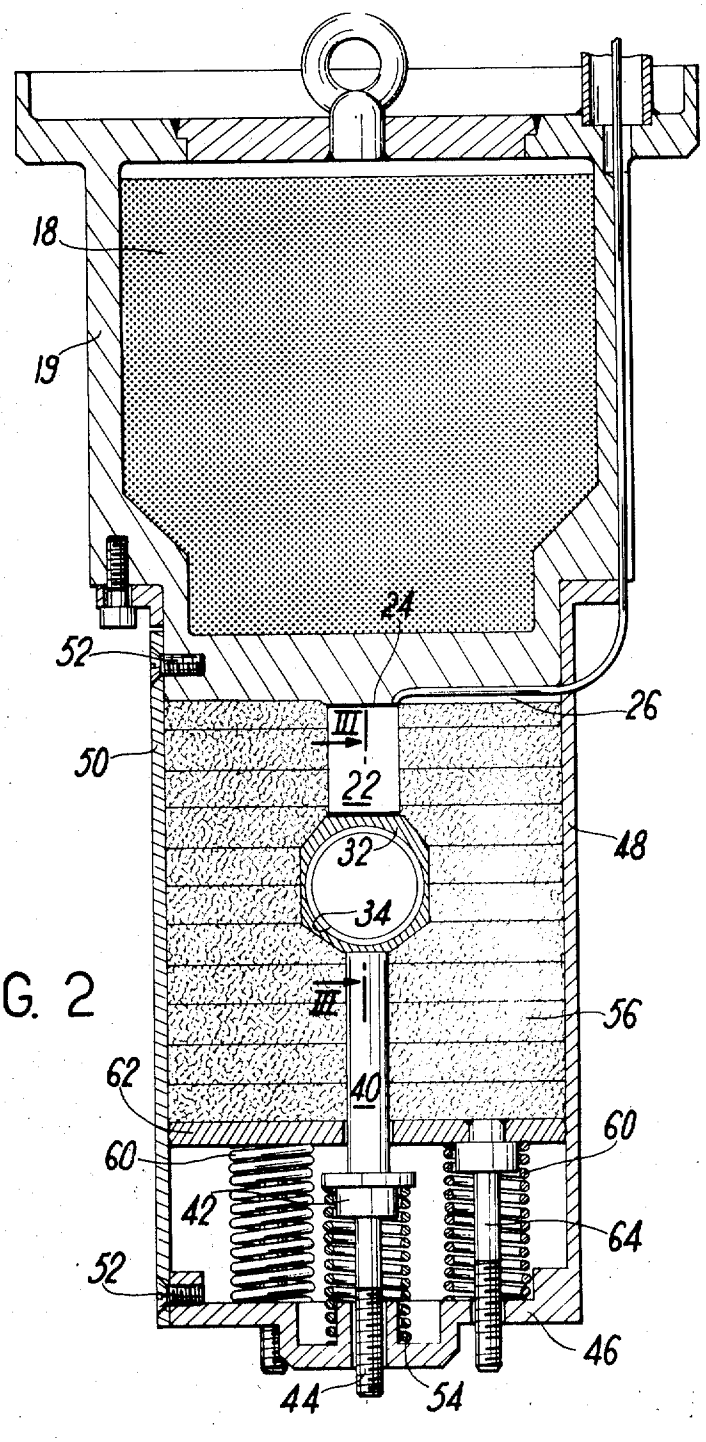
FIG. 2 is a detail view on a larger scale showing the core of the generator in cross-section along the vertical mid-plane.
Figure 3:
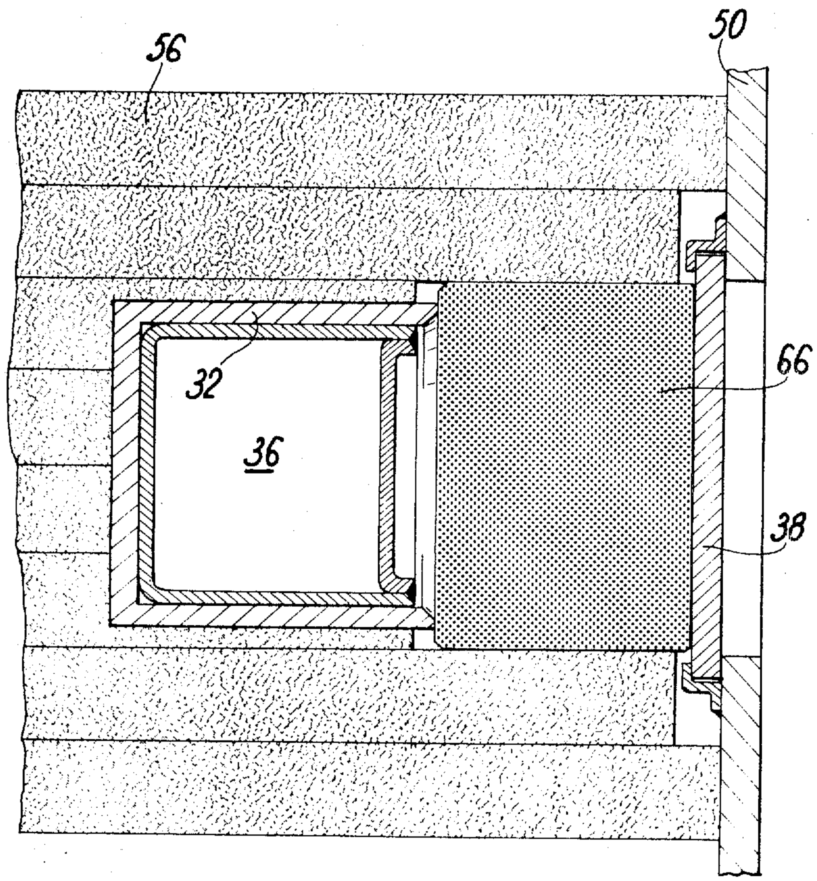
FIG. 3 is a view in partial cross-section along the line III—III of FIG. 2.

The core of the generator which is illustrated in FIGS. 2 and 3 is carried by the plug 18. Said core is composed of a thermopile 22 constituted by pairs of elements having a base of bismuth telluride which are respectively doped with N and P elements. It is possible in particular to make use of solid solutions of $Bi_2Te_3$, $Sb_2Te_3$ and $Bi_2Se_3$. This thermopile is of prismatic shape and rests on a boss 24 formed on the underface of the plug. Electrical insulation is provided by means of a coating of alumina sprayed on each end face of the thermopile. The electric lead-out wires from the thermopile are passed along a groove 26 of the plug and pass out of the housing via a leak-tight connector 28 in which a union 30 permits of producing a vacuum (as shown in FIG. 1).

There is applied against the underface of the thermopile 22 a heat collector 32 constituted by a prism having a horizontal axis and formed of a material which is endowed with good thermal conductivity such as molybdenum, for example; said collector is pierced by a horizontal opening 34 for accommodating a radioactive source 36 (shown in FIG. 3) which is maintained in position by means of a sliding shutter 38.

An elastic system serves to maintain the heat collector 32 applied against the thermopile. Said system comprises a thrust rod 40 of heat-insulating material which is capable of withstanding compressive stresses. The asbestos-base material which is available commercially under the name of "marinite" is specially suited to this purpose. There is applied against said rot a button 42 which has an extension in the form of a rod 44 having a threaded end portion which is adapted to traverse an end-plate 46. Said end-plate is coupled to the plug 18 by means of two side-straps 48 and two half-shells 50 (as shown in FIG. 1) which are secured by removable means consisting of screws 52 in the generator which is illustrated in the drawings. A compression spring 54 serves to apply an upward thrust on the button 42, thereby tending to grip the heat collector 32 and thermopile 22 between the boss 24 of the plug and the rod 40 and providing a satisfactory thermal contact without subjecting the source itself to forces of great magnitude.

Between the side-straps and the half-shells 50 on the one hand and the axial chain which is constituted by the thermopile 22, the heat collector 32 and the rod 40 on the other hand, there is placed a heat-insulation packing made up of a stack of half-discs 56 of heat-insulating material. Said stack is maintained assembled by means of the half-shells 50 and by virtue of the elastic force exerted by three springs 60 which are compressed between the end-plate 46 and a clamping-plate 62 which supports the stack. Three threaded rods 64 which are rigidly fixed to the clamping-plate 62 also pass through the end-plate 46 along the axes of the springs 60.

It is apparent that, when the unit is assembled as shown in FIGS. 1 and 2, the thermal resistances are relatively low, inasmuch as the clearance between the radioactive source 36 and the heat collector 32 can be very small. The collector 32 is pressed against the thermopile 22 and this latter is applied against the plug 18 with a force which is sufficient to ensure a good contact, any thermal resistance at this point being caused solely by the thin film of alumina which constitutes the electric insulator. Starting from the plug, the heat flows within the containment vessel through the contacting zones of the casing 19 and of the vessel whilst the lateral clearance can be very small. Finally, the collector serves to convey the whole quantity of heat given off by the entire surface area of the source towards the thermopile and makes it possible to heat the extremity of this latter to a sufficiently elevated temperature.

The process of assembly of the generator will have become apparent from the foregoing description. Consequently, the main stages of assembly of the generator core will now be indicated only briefly in order to demonstrate the fact that the assembly operation can be brought almost to completion in a normal atmosphere, only the loading of the source being necessarily carried out in a hot cell.

The plug 18 fitted wtih the side-straps 48, end-plate 46, clamping-plate 62 and elastic system is placed in inverted position, the rods 44 and 64 being retained by means of nuts (not shown) in a position in which the springs 54 and 60 are in compression. The thermopile 22, the collector 32 and the rod 40 are placed in position in turn together with the chamfered half-discs by which they are surrounded. The half-shells 50 are then secured, the nuts being finally removed in order to release the rods 64 and 44. All the operations described above are carried out in a normal atmosphere. In consequence, the insulating half-discs 56 can be perfectly adjusted to the geometrical configuration of the heat collector 32 and to the insulating rod 40 with a view to preventing the natural convection of the neutral gas with which the housing 16 is subsequently filled, as otherwise any such convective process would result in prohibitive heat losses. The two half-shells 50 serve to provide lateral support for the two half-discs 56 and, by virtue of the chamfered bearing edges of the half-discs, the force applied by the springs 60 produces not only an axial clamping action but also a radial clamping action.

The plug which is thus equipped is transferred to a hot cell; the only operations which then remain to be carried out therein consist in placing the source 36 inside the heat collector 32, inserting a heat-insulating plug 66 behind the source (as shown in FIG. 3) and locking said plug in position by causing the shutter 38 to slide within guides formed for this purpose in the half-shell 50 which provides access to the source. Thereupon, the core unit of the generator thus formed need only be transferred into the housing 16. A welded joint is formed between said housing and the plug. Finally, a vacuum is produced within the housing 16 by means of the union 30 and a neutral gas such as xenon, for example) is introduced therein.

Any auxiliaries or components which are supplied by the generator are placed in position and the lid 12 is secured. The generator is then operational.

It is apparent that the generator is assembled by means of a process which makes it possible to load the radioactive source practically as a final step and to carry out the operations described above under conditions which permit of effective heat insulation in all directions except that of the thermopile. It is to be understood that the invention is not limited to the single mode of operation which has been described with reference to the accompanying drawings solely by way of example.

What we claim is:

1. An electric generator which comprises: an outer housing; an inner metallic housing; a thermopile in said inner housing; a support plug forming part of said inner housing; a thrust rod formed of heat-insulating material; resilient means which bear on the inner housing and on the thrust rod to urge the thrust rod towards said thermopile and to apply said thermopile onto the support plug; a heat collector having an internal bore between said thermopile and said thrust rod; a radioactive isotope heat source in said bore; and a packing of thermally and electrically insulating material which separates said thermopile and said heat collector from said inner housing.

2. A generator in accordance with claim 1, wherein the heat collector is constituted by a prism having a horizontal axis and formed of material having good thermal conductivity, said heat collector being pierced by a recess which has a horizontal axis for accommodating the radioactive source and which is located opposite to a sealable opening of the housing.

3. An electric generator in accordance with claim 1 wherein the inner housing comprises an end-plate and side straps connecting said end plate to said support, said side-straps clamping the packing material in position.

4. A generator in accordance with claim 3, wherein the inner housing comprises two detachable half-shells, said sealable opening being provided in one of said half-shells.

5. A generator in accordance with claim 3 wherein said packing material is constituted by a stack of chamfered half-discs interposed between the plug and a clamping-plate which is urged towards the plug by second resilient means which are applied against the end-plate.

6. A generator in accordance with claim 1, wherein the thermopile comprises paired p- and n-thermoelectric elements consisting of tellurium or bismuth compounds.

References Cited

UNITED STATES PATENTS

| | | | |
|---|---|---|---|
| 2,811,568 | 10/1957 | Lloyd | 136—202 |
| 3,075,030 | 1/1963 | Elm et al. | 136—202 |
| 3,117,913 | 1/1964 | Shoupp | 136—202X |
| 3,161,786 | 12/1964 | Gunther | 310—4 |
| 3,192,069 | 6/1965 | Vogt et al. | 136—202 |
| 3,272,658 | 9/1966 | Rush | 136—202X |
| 3,329,532 | 7/1967 | Austin et al. | 136—202 |
| 3,357,866 | 12/1967 | Belofsky | 136—202 |

CARL D. QUARFORTH, Primary Examiner

S. J. LECHERT, JR., Assistant Examiner

U.S. Cl. X.R.

136—208, 224, 230